United States Patent [19]
Luz et al.

[11] Patent Number: 5,372,356
[45] Date of Patent: Dec. 13, 1994

[54] LOAD MOUNTING SYSTEM HAVING PRECOMPRESSED ELASTOMERIC SUPPORT ELEMENTS FOR TENSILE AND COMPRESSIVE LOADINGS

[75] Inventors: James J. Luz, Tewksbury; Craig M. Gardner, Danvers, both of Mass.

[73] Assignee: General Electric Company, Schenectady, N.Y.

[21] Appl. No.: 995,210

[22] Filed: Dec. 22, 1992

[51] Int. Cl.$^5$ .................................... F16F 3/08
[52] U.S. Cl. ............................ 267/140.2; 267/140.4; 267/141.1
[58] Field of Search .............. 267/85, 89, 70, 91, 267/95, 104, 141.1, 293, 295, 175, 177, 178, 182, 291, 140.4, 146.2; 188/380; 248/575, 577

[56] References Cited

U.S. PATENT DOCUMENTS

| | | | |
|---|---|---|---|
| 2,432,361 | 12/1947 | Winters | 267/85 |
| 2,472,029 | 5/1949 | Thiry | 267/140.2 |
| 3,035,799 | 5/1962 | Pierce | 267/140.2 |
| 3,086,765 | 4/1963 | Zanow | 267/141.1 |
| 3,233,560 | 2/1966 | Beck | 267/141.1 |
| 4,391,436 | 7/1983 | Fishbaugh | 267/140.2 |
| 4,967,681 | 11/1990 | Strain et al. | 267/70 |
| 4,997,171 | 3/1991 | Toms, Jr. | 267/70 |

FOREIGN PATENT DOCUMENTS

| | | | |
|---|---|---|---|
| 0019533 | 11/1980 | European Pat. Off. | 267/141.1 |
| 9112440 | 8/1991 | WIPO | 267/141.1 |

Primary Examiner—Matthew C. Graham
Attorney, Agent, or Firm—Nixon & Vanderhye

[57] ABSTRACT

The mounting system 10 includes a base support structure 12, a load support 14 and a compressive force-applying member 16. Compression elements 18 and 20 are disposed between the base support structure 12 and load support 14 and the load support 14 and member 16, respectively. Rods 22 interconnect base support structure 12 and member 16. Elements 18 and 20 are precompressively loaded by displacing member 16 toward base support structure 14 and compression elements 18 and 20 carry compression and tensile loadings while under compression. Support rods 22 extend through apertures in load support 14 to ensure vibration isolation of load support 14 from base support structure 12.

19 Claims, 2 Drawing Sheets

LOAD MOUNTING SYSTEM HAVING PRECOMPRESSED ELASTOMERIC SUPPORT ELEMENTS FOR TENSILE AND COMPRESSIVE LOADINGS

TECHNICAL FIELD

The present invention relates to a load mounting system for supporting high tensile and compressive static loads, while enabling vibration isolation and particularly relates to a combined high tensile and compressive load-carrying mounting system with superior noise isolation. In the context of this invention, the phrase "tensile and compressive loads" means that the loads can act in opposite directions, e.g., upward loads and downward loads. The loads on the mounts will always be compressive, regardless of the load direction.

BACKGROUND

Many modern power-generating machinery systems have high power-to weight ratios and must satisfy stringent vibration or noise attenuation requirements. This has led to the development of mounting systems for accommodating these needs. Available mounting systems, however, satisfy some, but not all, of the requirements of vibration isolation over a wide frequency range, while supporting a broad range of tensile and compressive operating loads. For example, metallic isolation systems can be designed to support high tensile and compressive loads but do not offer superior isolation characteristics necessary for stringent noise applications, particularly over a wide frequency range. Additionally, standard elastomeric mounts are available which can support both tensile and compressive loads and offer good noise isolation but these mounts typically have low load carrying capability and tend to require large mounting surface areas.

To summarize the shortcomings of available mounting systems for supporting high tensile end compressive loads, metallic machinery mounting arrangements do not provide adequate vibration isolation over a wide range of frequencies. Currently available elastomeric mounts provide superior vibration isolation over a wide frequency range but offer either (i) low tensile and compressive load carrying capabilities or (ii) high, compression-only load carrying capabilities. In short, current mounting systems, such as those designed for marine propulsion units, do not fulfill these requirements. Moreover, where elastomeric mounts are used, the problem of creep, or long-term permanent deflection, associated with such mounts has not been solved in the context of an overall system affording these capabilities.

DISCLOSURE OF THE INVENTION

The mounting system of the present invention combines high tensile and compressive load carrying capability with superior noise isolation over a wide frequency range and meets these requirements in an environment of long-term creep associated with such elastomeric mounts. Furthermore, the present mounting system offers these advantages while imposing minimal mounting requirements on machinery support structure. This latter feature is extremely desirable, for example, in marine propulsion mountings. It will be appreciated that large mounting holes in supporting structure onboard ships has an adverse effect on the structural integrity of the supporting structure, and limits the flexibility in the positioning of the mounts and the ability to relocate the mounts.

More specifically, and in accordance with the present invention, there is provided a mounting system comprised of a base support structure, a support for the load, compression-only elements, a compressive force-applying member, and a coupling. Thus, a first compression-only element extends between the base support structure and the load support. A second compression element is provided between the load support and the compressive force-applying member. The term "support for the load" or "load support" means the member which transfers the loads from the supported equipment to the mounts; for example, a shelf or foot extending from the equipment, or the equipment itself. The base support structure comprises the ultimate load-bearing structure, e.g., the structural foundation elements of a naval vessel. As used herein, the terms first or second compression-only element may refer to one or more such first or second elements whereby the term element may mean singular or plural. The coupling is a means of connecting the base support structure and the compressive force-applying member and is the means for applying the compressive force.

To use compression-only elements, i.e., any element with substantially higher load-carrying capability in the "compressive" direction than in the "tensile" direction, while simultaneously affording a capability of carrying large tensile and compressive loads, the compression-only elements are pre-loaded in compression to an extent such that compression is maintained at all times. The compressive force-applying member is located on the side of the load support remote from the base support structure, with the compression elements between the base support structure and load support on the one hand, and the load support and the compressive force-applying member on the other hand. The compressive force-applying member is directly coupled to the base support structure via the coupling and is isolated from the load support such that load vibration and vibration of the load support are isolated from the base support structure. By compressively pre-loading the first and second compression elements, all of the mounts remain in a compressed state during all loading conditions including both tensile and compressive loadings under the effects of long-term creep.

In a particular preferred embodiment of the present invention, the first and second compression elements are compression-only elements disposed between the base support structure, load structure and force-applying member. The member and base support structure are interconnected by a plurality of support rods which extend through the load support with substantial clearance such that vibration from the load and/or load support is not imparted directly to the support rods and ultimately to the base support structure, thereby bypassing the elastomeric elements. As a result of this configuration, the coupling between the member and base support structure not only provides the pre-compressive loads on the mounts but the substantial clearance also ensures noise isolation of the load support from the base support structure through the elastomeric mounts. The mounts are thus maintained in a compressed state during all loading conditions, while simultaneously compressive loadings are maintained on the mounts during both compressive and tensile loadings on the mounting system.

In a preferred embodiment according to the present invention, there is provided a mounting system for a load comprising a base support structure, a support for the load spaced on one side of the base support structure and a compressive force-applying member spaced from the load support and on a side thereof remote from the base support structure. A first compression element is disposed between the base support structure and the load support and secured to one of the base support structure and the load support and a second compression element is disposed between the load support and the force-applying member and secured to one of the load support and the member. A coupling is provided between the member and the base support structure for applying compressive loadings on the first and second elements to compressively pre-load the first and second elements to an extent that the first and second elements are maintained compressed during all anticipated loading of the mounting system by the load.

Accordingly, it is a primary object of the present invention to provide a mounting system for supporting high tensile and compressive loads while maintaining vibration isolation characteristics between the load structure and the base support over a wide range of frequencies, with the mounts being maintained under compression during all loading conditions.

BEST MODE FOR CARRYING OUT THE INVENTION

Reference will now be made in detail to a present preferred embodiment of the invention, an example of which is illustrated in the accompanying drawings.

Figure 1:
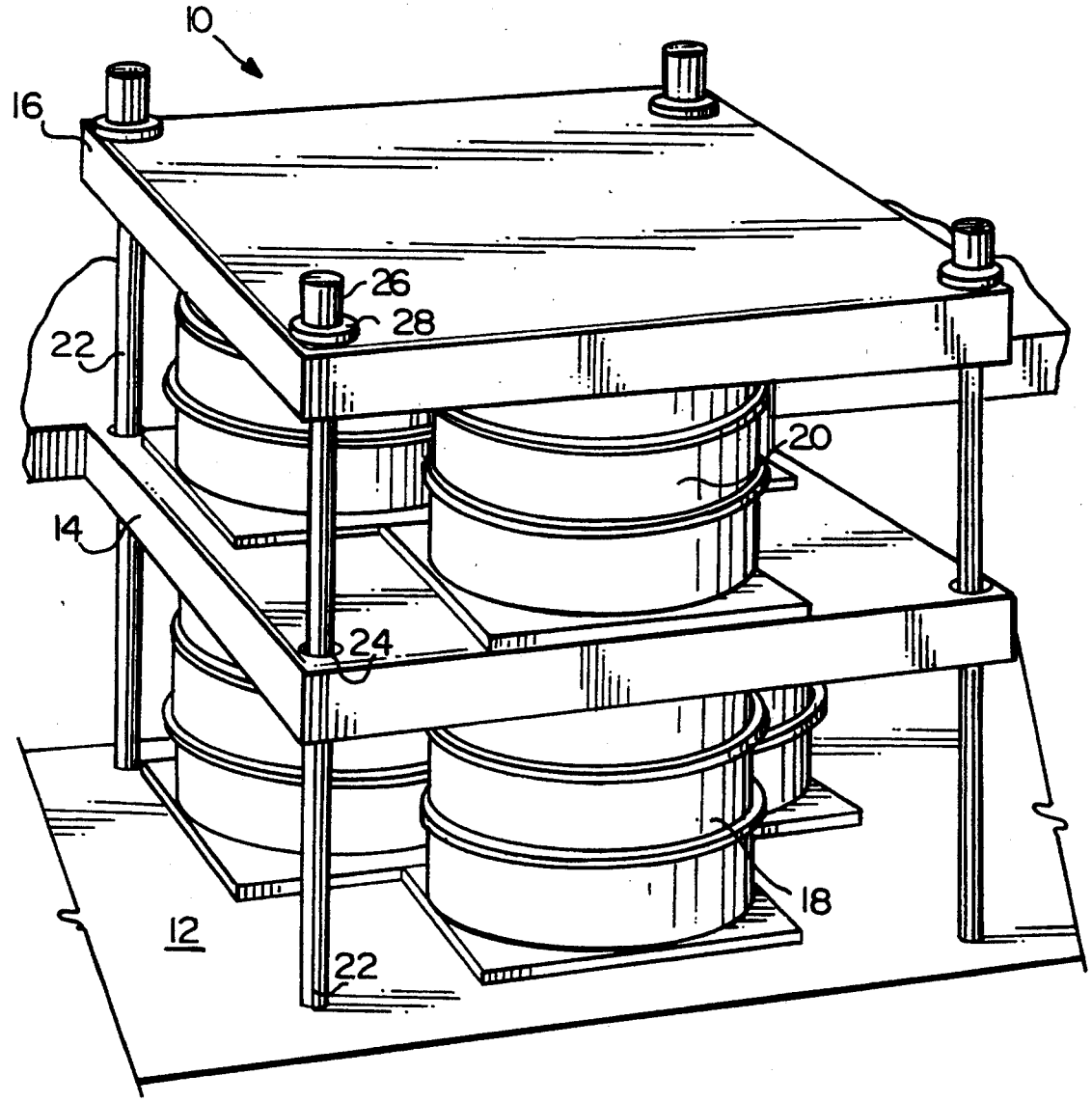
FIG. 1 is a perspective view of a mounting system according to the present invention.

Referring now to the drawing figures, particularly to FIG. 1, there is illustrated a mounting system, generally designated 10, constructed in accordance with the present invention. The mounting system 10 includes a base support structure 12, a support 14 for the load, i.e., a supported equipment shelf, and a compressive force-applying member 16, hereafter sometimes referred to as cover or member 16. It will be appreciated that the base support structure 12 comprises the ultimate support foundation for the equipment carried by the load support 14. Base support structure 12 may therefore comprise a support foundation such as the deck of a naval vessel or may comprise another piece of equipment. Load support 14 is attached directly to the load or equipment to be supported and transmits the loading thereof to the base support structure through mounts 18 and 20. The compressive force-applying member 16 serves to compressively pre-load compression elements 18 and 20 disposed respectively between base support structure 12 and load support 14 and the load support 14 and member 16.

In the embodiment of the present invention illustrated in FIG. 1, the first and second compression elements 18 and 20 comprise elastomeric compression-only mounts. Compression-only mounts are those elastomeric elements which carry loadings only in compression and do not have any substantial tensile load-carrying capability. The lower compression element 18 may be secured to one or both of the base support structure 12 and load support 14, while the second compression element 20 may be secured to one or both of the load support 14 and member 16. By securing the compression elements to only one of the parts between which the elements are located, the elements will not be loaded in tension under any loading event. By connecting the compression elements to both parts, tensile loadings on the elements are still avoided under normal operating conditions because of the pre-compression loading on the elements, as described hereinafter.

To apply pre-compressive loadings to the elements 18 and 20, while simultaneously isolating the vibrations of the load and load support from the base support structure, a coupling is provided between the base support structure 12 and member 16 which is isolated from, i.e., not attached to, the load support 14. In this preferred from, the coupling includes one and preferably a plurality of support rods 22 which are secured to base support structure 12 and member 16. As illustrated, the rods 22 extend, with clearance, through apertures 24 formed in the load support 14 whereby the support rods 22 are maintained out-of-contact with the load support 14 throughout the full range of movement of the load support 14 under the anticipated loading and vibration. The upper ends of the rods 22 are threaded and receive threaded nuts 26 and washers 28. By tightening the nuts on the rods 22, the elements 18 and 20 are pre-compressively loaded. This pre-compression loading results in an additional compressive loading on the lowermost element 18, in addition to the load carried by element 18 from load support 14. The amount of pre-compression required is determined based on the maximum amount of deflection which will occur at the compression elements 20. This pre-compression loading includes deflections attributable to long-term creep of the elastomeric elements, as well as the operating loads. Further, the amount of pre-compression is such that both elements 18 and 20 remain in contact with their mating surfaces at all times. In the event that unanticipated loadings result in either of elements 18 or 20 becoming unloaded, the amount of pre-compression loading can be adjusted by re-tightening the threaded nuts 26 on the rods 22.

It will be appreciated that while the elements 18 and 20 are illustrated as lying in registry one with the other, they need not lie in such registry and need not have a one-to-one correspondence on opposite sides of the load support 14. Still further, the coupling between the base support structure 12 and member 16 not only imparts pre-compressive loadings to the elements 18 and 20 but does so in a manner maintaining vibration isolation from the load support 14. Thus, all elastomeric elements 18 and 20 are maintained in a compressed state during all loading conditions, wile the load support 14 is simultaneously isolated from the base support structure 12.

Figure 2:
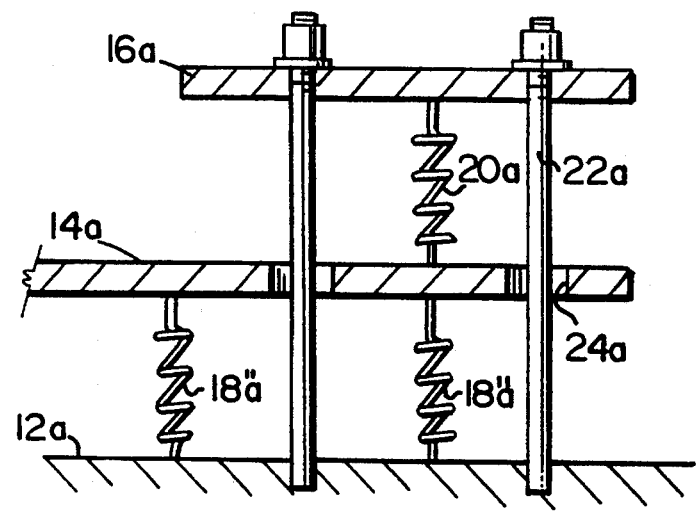
FIG. 2 is a fragmentary cross-sectional view schematically illustrating a second embodiment of the mounting system of the present invention.

Referring now to FIG. 2, it will be seen that a similar mounting system is disclosed. That is, there is provided a base support structure 12a, a load support 14a and a compressive force-applying member 16a. For simplicity, the first and second elastomeric compression elements are indicated or depicted by helical compression springs 18a', 18a", and 20a. Compressive load-applying rods 22a extend between base support structure 12a and member 16a. Member 16a applies compressive loadings to the elements 18a and 20a, while isolating the load support 14a from base support structure 12a by the clearance in the openings 24a in load support 14a.

Hence, as in the previous embodiment, the springs are maintained under compression for all anticipated loading conditions and the load support 14a is isolated from the base support structure 12a.

Figure 3:
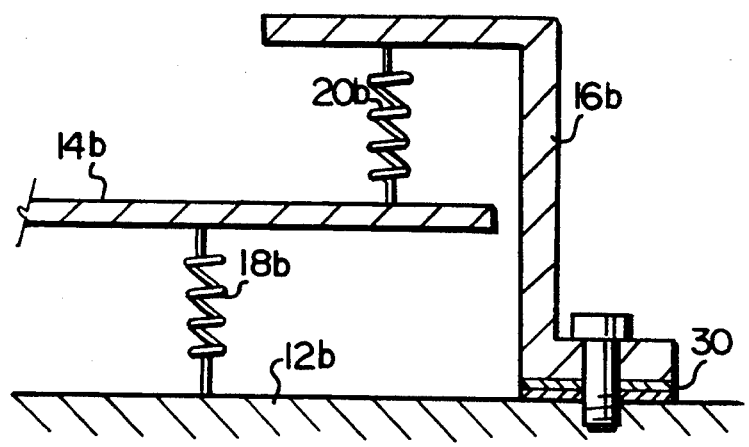
FIG. 3 is a view similar to FIG. 2 illustrating a further embodiment of the present invention.

In FIG. 3, a similar system is illustrated employing a base support structure 12b, a load support 14b and a compressive load-applying member 16b. Compression elements 18b and 20b are disposed between the base support structure 12b and load support 14b and load support 14b and member 16b, respectively. The preloading compression is applied by lowering member 16b when initially installed. For example, the member 16b is bolted to the base support structure 12b and a pre-compression loading may be applied to the compression elements or springs 20b and 18b at the time of the initial installation of the mount, e.g., by removing the shims 30. Thus, the elements 18b and 20b and pre-compressively loaded and maintained in compression to carry the compressive and tensile loadings for all anticipated loadings on the mount, while at the same time the load support 14b is isolated from the base support structure 12b.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A mounting system for a load comprising:
   a base support structure;
   a support for the load spaced on one side of said base support structure;
   a compressive force-applying member spaced from said load support and on a side of said load support opposite and remote from said base support structure;
   a plurality of substantially identical discrete compression elements;
   a first discrete compression element of said plurality of elements disposed between said base support structure and said load support and secured to one of said base support structure and said load support;
   a second discrete compression element of said plurality of elements disposed between said load support and said member and secured to said one of said load support and said member;
   a third discrete compression element of said plurality of elements disposed between said load support and one of said base support structure and said member whereby the number of said discrete compression elements on opposite sides of said load support is different from one another; and
   a coupling between said member and said base support structure for applying compressive loadings on said first, second and third elements to compressively pre-load said first, second and third elements to the extent that said first, second and third elements are maintained compressed during all anticipated loading of said mounting system by said load in directions toward and away from said base support structure.

2. A system according to claim 1 wherein said coupling applying the compressive loadings is vibration isolated from said load support.

3. A system according to claim 2 wherein said coupling includes a rod connected at opposite ends to said base support structure and said member, said load support having an opening therethrough enabling said rod to pass therethrough with clearance thereby isolating said load support and said compressive load applying coupling from one another.

4. A system according to claim 2 wherein said coupling includes a plurality of rods connected at opposite ends to said base support structure and said member, said load support having a plurality of openings therethrough enabling said rods to pass therethrough, respectively, with clearance, thereby isolating said load support and said compressive load applying coupling from one another.

5. A system according to claim 1 wherein said elements are formed of an elastomeric material.

6. A system according to claim 1 wherein said elements comprise compression-only mounting elements.

7. A system according to claim 1 wherein said elements comprise compressed springs.

8. A system according to claim 1 wherein said first element is secured to both said base support structure and said load support and said second element is secured to both said load support and said member.

9. A system according to claim 1 wherein said coupling applying the compressive loadings is vibration isolated from said load support, said coupling including a rod connected at opposite ends to said base support structure and said member, said load support having an opening therethrough enabling said rod to pass therethrough with clearance thereby isolating said load support and said compressive load applying coupling from one another, said elements comprising compression-only mounting elements, said first element being secured to both said base support structure and said load support and said second element being secured to both said load support and said member.

10. A system according to claim 1 wherein said coupling applying the compressive loadings is vibration isolated from said load support, said coupling including a plurality of rods connected at opposite ends to said base support structure and said member, said load support having a plurality of openings therethrough enabling said rods to pass therethrough, respectively, with clearance, thereby isolating said load support and said compressive load applying coupling from one another, said elements comprising compression-only mounting elements, said first element being secured to both said base support structure and said load support and said second element being secured to both said load support and said member.

11. A mounting system for a load comprising:
    a base support structure;
    a support for the load spaced on one side of said base support structure;
    a compressive force-applying member spaced from said load support and on a side of said load support opposite and remote from said base support structure;
    a plurality of discrete compression elements;
    a first discrete compression element of said plurality of elements disposed between said base support structure and said load support and secured to one of said base support structure and said load support;
    a second discrete compression element of said plurality of elements disposed between said load support and said member and secured to said one of said load support and said member and lying in registration through said load support with said first element;

a third discrete compression element of said plurality of elements disposed between said load support and one of said base support structure and said member and out of registration with said first and second elements such that the arrangement of the elements on opposite sides of said load support is different from one another; and a coupling between said member and said base support structure for applying compressive loadings on said first, second and third elements to compressively pre-load said first, second and third elements to the extent that said first, second and third elements are maintained compressed during all anticipated loading of said mounting system by said load in directions toward and away from said base support structure.

12. A system according to claim 11 wherein said coupling applying the compressive loadings is vibration isolated from said load support.

13. A system according to claim 12 wherein said coupling includes a rod connected at opposite ends to said base support structure and said member, said load support having an opening therethrough enabling said rod to pass therethrough with clearance thereby isolating said load support and said compressive load applying coupling from one another.

14. A system according to claim 12 wherein said coupling includes a plurality of rods connected at opposite ends to said base support structure and said member, said load support having a plurality of openings therethrough enabling said rods to pass therethrough, respectively, with clearance, thereby isolating said load support and said compressive load applying coupling from one another.

15. A system according to claim 11 wherein said elements are formed of an elastomeric material.

16. A system according to claim 11 wherein said elements comprise compression-only mounting elements.

17. A system according to claim 11 wherein said elements comprise compressed springs.

18. A system according to claim 11 wherein said first element is secured to both said base support structure and said load support and said second element is secured to both said load support and said member.

19. A system according to claim 11 wherein the number of said elements on opposite sides of said load support is different from one another.

* * * * *

UNITED STATES PATENT AND TRADEMARK OFFICE
CERTIFICATE OF CORRECTION

PATENT NO. : 5,372,356
DATED : December 13, 1994
INVENTOR(S) : James J. LUZ; Craig M. GARDNER; John R. SEYMOUR; Christopher G. CIMENTO

It is certified that error appears in the above-indentified patent and that said Letters Patent is hereby corrected as shown below:

On the Title Page, item [75] should read as follows:
    James J. Luz, Tewksbury; Craig M. Gardner, Danvers,
John R. Seymour, Westford; Christopher G. Cimento,
Watertown, all of Mass.

Signed and Sealed this

Twenty-eight Day of February, 1995

Attest:

BRUCE LEHMAN

*Attesting Officer*       *Commissioner of Patents and Trademarks*